United States Patent
Slogsnat et al.

(10) Patent No.: US 10,797,908 B2
(45) Date of Patent: Oct. 6, 2020

(54) SENSOR SYSTEM, INCLUDING DETECTION AND COMMUNICATION UNITS FOR DETECTING AND COMMUNICATION MEASURED VALUES, AND A METHOD FOR OPERATING THE SENSOR SYSTEM

(71) Applicant: Robert Bosch GmbH, Stuttgart (DE)

(72) Inventors: David Slogsnat, Tuebingen (DE); Falk Roewer, Reutlingen-Betzingen (DE)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 16/323,295

(22) PCT Filed: Jul. 31, 2017

(86) PCT No.: PCT/EP2017/069277
§ 371 (c)(1),
(2) Date: Feb. 5, 2019

(87) PCT Pub. No.: WO2018/046179
PCT Pub. Date: Mar. 15, 2018

(65) Prior Publication Data
US 2020/0195467 A1    Jun. 18, 2020

(30) Foreign Application Priority Data
Sep. 6, 2016   (DE) .................. 10 2016 216 867

(51) Int. Cl.
*G06F 1/00*      (2006.01)
*H04L 12/40*    (2006.01)
*H04L 12/10*    (2006.01)

(52) U.S. Cl.
CPC ........ *H04L 12/40039* (2013.01); *H04L 12/10* (2013.01); *H04L 12/40032* (2013.01)

(58) Field of Classification Search
None
See application file for complete search history.

(56) References Cited

U.S. PATENT DOCUMENTS

| 2005/0212932 A1 | 9/2005 | Steimle et al. |
| 2008/0055069 A1* | 3/2008 | Aiki ............ H04W 52/029 340/539.3 |

(Continued)

FOREIGN PATENT DOCUMENTS

| DE | 102012211057 A1 | 12/2012 |
| DE | 102012213732 A1 | 2/2013 |
| EP | 0940950 A2 | 9/1999 |

OTHER PUBLICATIONS

International Search Report for PCT/EP2017/069277, dated Sep. 22, 2017.

(Continued)

*Primary Examiner* — Nitin C Patel
(74) *Attorney, Agent, or Firm* — Norton Rose Fulbright US LLP; Gerard Messina

(57) ABSTRACT

A sensor system including a detection unit, which is designed to detect at least one physical variable and to output corresponding measured values, and a communication interface, which includes a communication unit and is designed to output the detected measured values at least in a normal operating mode, and which is designed to receive a data signal, which includes a clock signal, the communication unit being designed to use the clock signal as the operating clock in an energy-saving operating mode. Furthermore, a corresponding method is described.

13 Claims, 3 Drawing Sheets

(56) References Cited

U.S. PATENT DOCUMENTS

2010/0302198 A1* 12/2010 Tasher .................. G06F 3/0416
                                                                               345/173
2017/0154521 A1* 6/2017 Zamorano-Larrate ......................
                                                                              G08B 21/0446
2017/0331029 A1* 11/2017 Konno ................ H01L 41/1132

OTHER PUBLICATIONS

Engel, A. et al., "Energy-Efficient Heterogeneous Reconfigurable Sensor Node for Distributed Structural Health Monitoring", IEEE Conference on Design and Architectures for Signal and Image Processing (DASIP), 2012.

\* cited by examiner

SENSOR SYSTEM, INCLUDING DETECTION AND COMMUNICATION UNITS FOR DETECTING AND COMMUNICATION MEASURED VALUES, AND A METHOD FOR OPERATING THE SENSOR SYSTEM

FIELD

The present invention relates to a sensor system and a corresponding method for operating a sensor system according to the present invention.

BACKGROUND INFORMATION

Sensors are used in a variety of applications. In particular in mobile applications, it is important to minimize the energy consumption of the sensors.

Sensors may typically be switched off by a central controller to reduce their energy consumption. However, the sensor then has to run through the complete starting phase, also called powering up, before it is ready for operation. For rapid access to the sensor data, this phase may last too long, depending on the application.

Sensors may therefore also have an energy-saving mode, in which some of the sensor components are switched off or are only switched on cyclically. The memory in which the sensor data are located remains switched on, so that it consumes electrical energy. The sensor data may thus be read out at any time.

SUMMARY

The present invention provides a sensor system and a method.

The following example is accordingly provided:

A sensor system including a detection unit, which is designed to detect at least one physical variable and output corresponding measured values, and a communication interface, which includes a communications unit and is designed to output the detected measured values at least in a normal operating mode, and which is designed to receive a data signal which includes a clock signal, the communication unit being designed to use the clock signal as the operating clock in an energy-saving operating mode.

Furthermore, the following example is provided:

A method for operating a sensor system, including the steps of detecting measured values of at least one physical variable, outputting the detected measured values via a communication interface using a communication unit at least in a normal operating mode of the sensor system, receiving a data signal, which includes a clock signal, via the communication interface, and operating the communication unit in an energy-saving operating mode using the clock signal as the operating clock.

The detection unit may be any arbitrary measuring element. For example, MEMS-based measuring elements, optical measuring elements, or electromagnetic measuring elements may be used.

Conventional sensors typically have an internal clock supply, which supplies all elements of the particular sensor with an operating clock. The operating clock is to be understood as the signal which the individual digital elements use as the base or base clock for the individual process cycles.

In contrast, the present invention uses an external clock signal, which is applied to the communication interface, in order to operate at least the communication unit when the sensor system is in the energy-saving operating mode. The communication unit forms the logic, which is digital in particular, in the communication interface, which carries out the communication based on a corresponding protocol or bus system.

Possible communication interfaces are, for example, SPI interfaces, I2C interfaces, and I3C interfaces. However, any other type of digital interface is also possible.

If the communication unit is supplied by an external clock signal in the energy-saving operating mode, it may be activated or used without an energy consumer, for example, an oscillator, in the sensor system having to be activated.

The sensor system may thus also communicate in the energy-saving operating mode and receive and transmit data via the communication interface. It is thus possible to initialize the sensor system, for example, during a system start and then activate the energy-saving mode, in which, for example, the internal clock generation is deactivated. All components of the sensor system are thus also deactivated and their current consumption is minimized.

The energy consumption of the sensor system may be reduced by a factor of 10-100 by switching off the internal clock and/or switching on the internal clock generation as needed.

Advantageous specific embodiments and refinements are described herein with reference to the figures.

In one specific embodiment, the sensor system may include an oscillator, which is designed to start within a predefined time and to output a clock signal, the communication unit being designed to start the oscillator upon receiving the data signal in the energy-saving operating mode. The communication unit may thus operate based on the external clock signal and only activate the oscillator of the sensor system as needed. The communication unit thus enables automatic starting of the sensor system whenever an activity is recognized on the communication interface, i.e., for example, when data are transmitted via the particular data bus.

The oscillator may be designed, for example, as a ring oscillator, which starts within a predefined time of less than 100 µs. In particular ring oscillators start in a very short time and are therefore suitable for use in the sensor system according to the present invention. By using a rapidly starting ring oscillator, the waiting time until the full operational readiness of the sensor system may be minimized.

In one specific embodiment, the communication unit may include a data decoder, which is designed to decode the data signal in the energy-saving mode and to activate the oscillator only if the data signal includes an access to the sensor system. The communication unit may thus operate based on the external clock signal and thereby operate the data decoder. This decoder analyzes a data signal received via the communication interface before the oscillator is started. The communication unit only starts the oscillator, which enables the operation of the further components of the sensor system, if the data decoder establishes that the content of the data signal, for example, a user recognition, indicates an access to the sensor system.

In particular in bus systems having multiple users, the sensor system is only awakened or activated if it is also directly addressed.

In one specific embodiment, the sensor system may include a memory, which is coupled to the oscillator and the detection unit, and which is designed to use the clock signal of the oscillator as the operating clock and to store and/or output measured values of the detection unit and/or configuration data for the sensor system. Furthermore, the data decoder may be designed to activate the oscillator only when the use of the memory in the sensor system is activated. The piece of information as to whether the memory is used may be stored, for example, in configuration data, which are stored in the data decoder or the communication unit. The use of the memory may be activated, for example, in a specific operating mode, in which the detection unit periodically detects measured values, but these measured values are only read out sporadically. The sensor system may activate the energy-saving mode between the measurements and thus reduce the energy consumption. Only when data are to be read out from the memory via the communication interface may it be activated jointly with the oscillator.

The reverse of such an operating mode is, for example, an operating mode in which the sensor system is read out permanently, i.e., is operated, for example, in a so-called polling mode.

In one specific embodiment, the memory may be designed as a RAM memory and may be coupled to an energy supply in the energy-saving mode to keep the data. Of course, the RAM memory may also be coupled to an energy supply, i.e., supplied with energy, during normal operation. RAM memories are distinguished by very rapid access times. However, a RAM memory requires an operating clock for operation. Furthermore, a RAM memory requires an energy supply, without which the RAM memory—in contrast to, for example, EEPROM memories—loses its contents. The energy supply thus ensures that the RAM memory does not lose its data. However, the energy consumption of the RAM memory without an operating clock is very low and is only used to maintain the memory contents.

In one specific embodiment, the data decoder may be designed to check whether the data signal indicates an access to the memory, for example, reading or writing, and to switch on the oscillator only if the data signal indicates an access to the memory. Data which may be transmitted to the sensor system without accessing the memory are, for example, configuration data, which may be processed by the communication unit. Such data may relate, for example, to the communication on a data bus and may include, for example, a user identification, a data rate, or the like. It is thus not always necessary to activate the oscillator when the sensor system is addressed via the communication interface.

In one specific embodiment, the data decoder may be designed to extract control commands from the data signal and carry them out in the sensor system. Such control commands may include, for example, setting specific configurations in the communication unit. These may relate to the data communication via the communication interface as well as to the configuration of the sensor system, i.e., for example, the detection unit. For example, the operating mode of the sensor system may be selected or the energy-saving mode may be activated using such a control command.

In one specific embodiment, the communication unit may include a buffer memory, which is designed to store the, in each case, last detected measured value. The last measured value no longer has to be read out from the memory when it is retrieved via the communication interface. It thus becomes possible to output this, in each case, last detected measured value via the communication interface without switching on the oscillator. If further data are to be read from the memory or written into it, the oscillator may be switched on and the memory may be activated. In particular, the data decoder may also examine whether a data signal indicates an access to the memory space on which this last measured value is stored and output the value stored in the buffer if this is the case, without activating the oscillator and the memory.

The above embodiments and refinements may be arbitrarily combined with one another, if reasonable. Further possible embodiments, refinements, and implementations of the present invention also include combinations, which are not explicitly mentioned, of features of the present invention described above or hereafter with respect to the exemplary embodiments. In particular, those skilled in the art will also add individual aspects as improvements or supplements to the particular basic form of the present invention.

BRIEF DESCRIPTION OF THE DRAWINGS

The present invention will be explained in greater detail hereafter on the basis of the exemplary embodiments shown in the figures.

DETAILED DESCRIPTION OF EXAMPLE EMBODIMENTS

Figure 1:
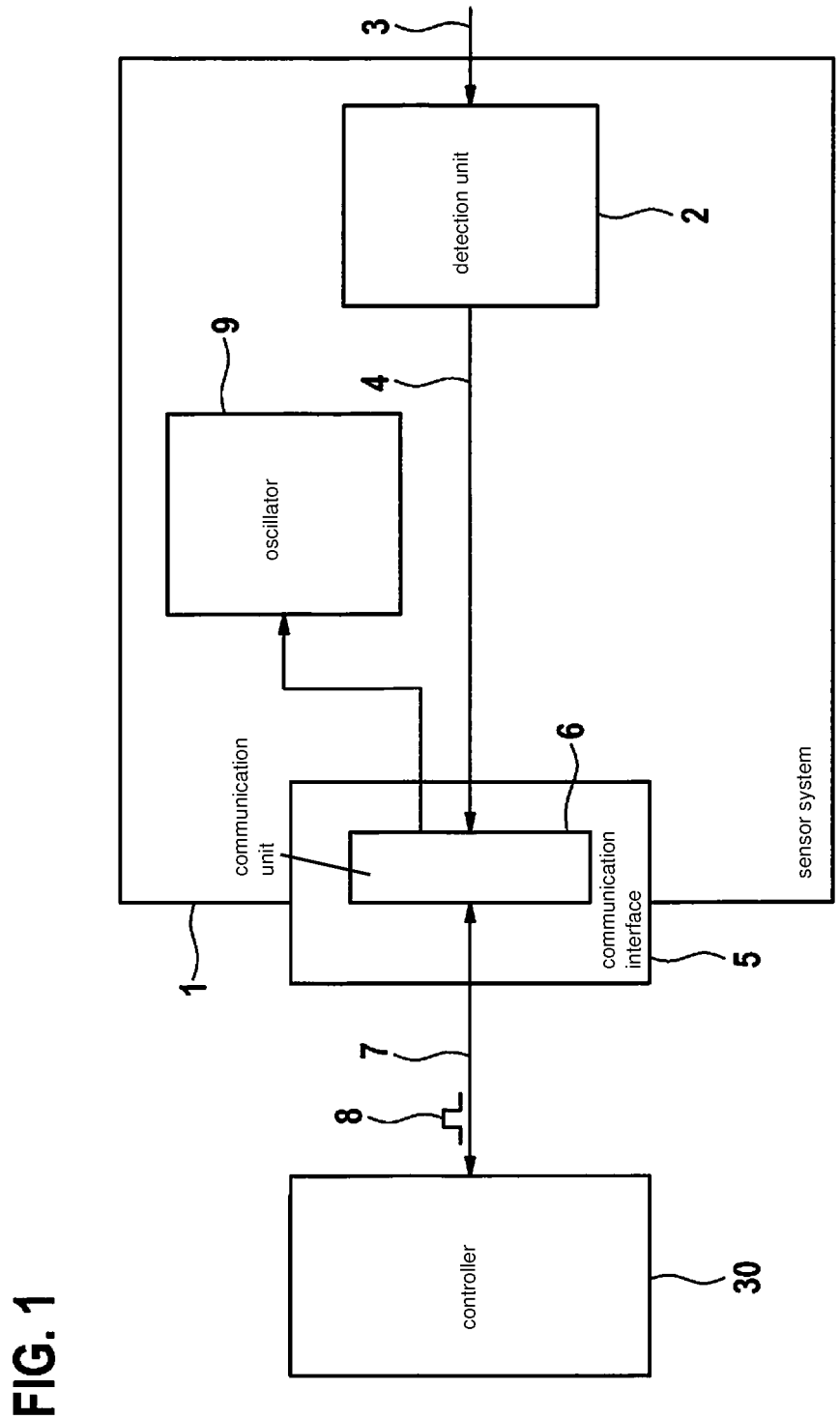
FIG. 1 shows a block diagram of one specific embodiment of a sensor system according to the present invention.

In all figures, identical or functionally-identical elements and devices—if not indicated otherwise—have been provided with the same reference numerals.

FIG. 1 shows a block diagram of one specific embodiment of a sensor system 1 according to the present invention. Sensor system 1 may be any type of sensor system 1. For example, sensor system 1 may be used to detect accelerations and rotation rates. Such a sensor system 1 may be used, for example, in mobile applications, such as smartphones or the like.

Sensor system 1 includes a detection unit 2. This represents the actual sensor element and detects at least one physical variable 3, for example, rotation rates and accelerations. Detection unit 2 outputs corresponding measured values 4, which are output via a communication interface 5, for example, to a central controller 30. Furthermore, an oscillator 9 is provided in sensor system 1, which generates an operating clock for the individual elements of sensor system 1 when it operates in a normal operating mode. In the normal operating mode, sensor system 1 is unrestrictedly functional and no special energy-saving measures are activated. A further possible operating mode is a so-called energy-saving mode, in which energy-saving functions are activated in sensor system 1 and, for example, individual elements are switched off or cyclically activated.

All elements which are used for the communication between sensor system 1 and controller 30 are summarized under communication interface 5. In addition to, for example, a plug or strip conductors and the corresponding terminals (not shown separately), communication interface 5 includes a communication unit 6, which includes the logic which is essential for the communication.

Communication unit 6 may be compatible, for example, with a bus protocol, for example, SPI, I2C, I3C, or the like, i.e., it may receive and output a data signal 7 on the basis of the corresponding protocol. Communication unit 6 may operate in particular as a slave of the particular bus system, while controller 30 may be, for example, the particular master.

As mentioned above, sensor system 1 may include an energy-saving mode. If sensor system 1 is put into the energy-saving mode, it may switch off all elements which are not necessary to maintain the energy-saving mode.

To enable the communication with and thus the activation of sensor system 1 even in the energy-saving mode, communication unit 6 is kept operationally ready. However, it is not supplied with a clock which is provided by oscillator 9. Rather, communication unit 6 may use a clock 8 of data signal 7, which is emitted by controller 30, as the operating clock.

Communication unit 6 is thus also capable of carrying out logical operations when oscillator 9 is switched off. For example, communication unit 6 may be designed to analyze data signal 7 and to switch on oscillator 9 when it receives data signal 7. Sensor system 1 may thus be shifted out of the energy-saving mode into the normal operating mode as soon as an activity of communication interface 5 is recognized.

In other specific embodiments, communication unit 6 may carry out an analysis of the received data and may only activate oscillator 9 or other elements in sensor system 1 if predefined conditions apply, for example, if sensor system 1 is directly addressed. Possible conditions will be explained in greater detail in conjunction with FIG. 3. It is understood that individual elements, for example, the memory, of the specific embodiment of FIG. 3 may also be combined with the specific embodiment of FIG. 1.

Figure 2:
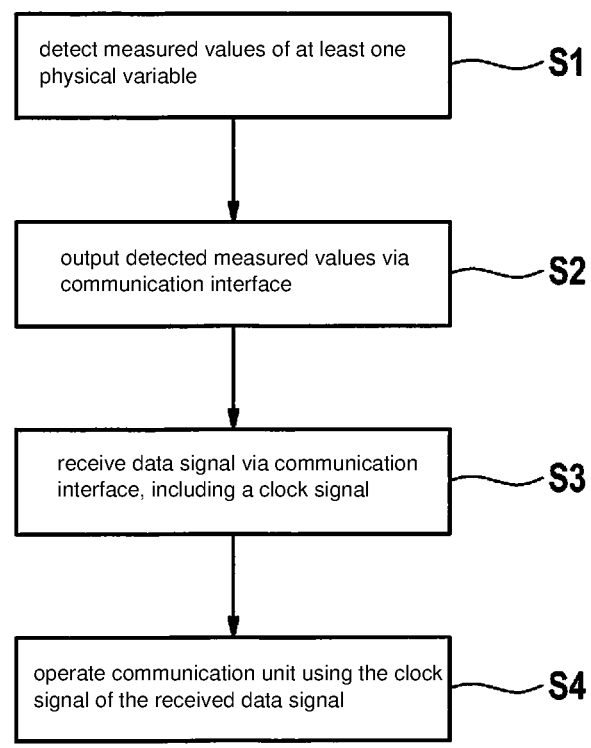
FIG. 2 shows a flow chart of one specific embodiment of a method according to the present invention.

FIG. 2 shows a flow chart of one specific embodiment of a method according to the present invention for operating a sensor system 1, 11.

The method provides that measured values 4, 14 of at least one physical variable 3, 13 are detected in sensor system 1, 11. Although this step is identified with S1, this does not imply any sequence between the first step and the further steps. In a second step S2, detected measured values 4, 14 may be output via a communication interface 5, 15 using a communication unit 6, 16 at least in a normal operating mode of sensor system 1, 11.

To enable the data communication between sensor system 1, 11 and, for example, an external controller 30, reception S3 of a data signal 7, 17 via communication interface 5, 15 is provided, data signal 7, 17 including a clock signal 8, 18.

In an energy-saving operating mode of sensor system 1, 11, it is provided to operate S4 communication unit 6, 16 using clock signal 8, 18 of received data signal 7, 17 as operating clock 22.

In one specific embodiment, it may be provided that an oscillator 9, 19 of sensor system 1, 11, which starts within a predefined time and outputs a corresponding clock signal 8, 18, is switched on upon receiving data signal 7, 17. Such an oscillator 9, 19 may be, for example, a ring oscillator.

It may also be provided to decode data signal 7, 17 in communication unit 6, 16 in the energy-saving mode and to switch on oscillator 9, 19 only if data signal 7, 17 includes an access to sensor system 1, 11.

Furthermore, it may also be provided to store detected measured values 4, 14 in a memory 21, which is coupled to oscillator 9, 19 and detection unit 2, 12. Memory 21 may be operated using clock signal 8, 18 of oscillator 9, 19 as operating clock 22. Oscillator 9, 19 may only be activated if the use of memory 21 in sensor system 1, 11 is activated and a data signal 7, 17 is received. Alternatively, oscillator 9, 19 may be switched on only if data signal 7, 17 indicates an access to memory 21.

Additionally or alternatively to memory 21, a buffer memory 24 may store the, in each case, last of detected measured values 4, 14 in communication unit 6, 16. This measured value may be output without activating oscillator 9, 19. For this purpose, data signal 7, 17 may be analyzed to establish whether this last measured value 4, 14 is to be read.

Furthermore, control commands may be extracted from data signal 7, 17 and carried out in sensor system 1, 11. Such control commands may, for example, shift sensor system 1, 11 from the energy-saving mode into another mode, for example, a normal operating mode.

Figure 3:
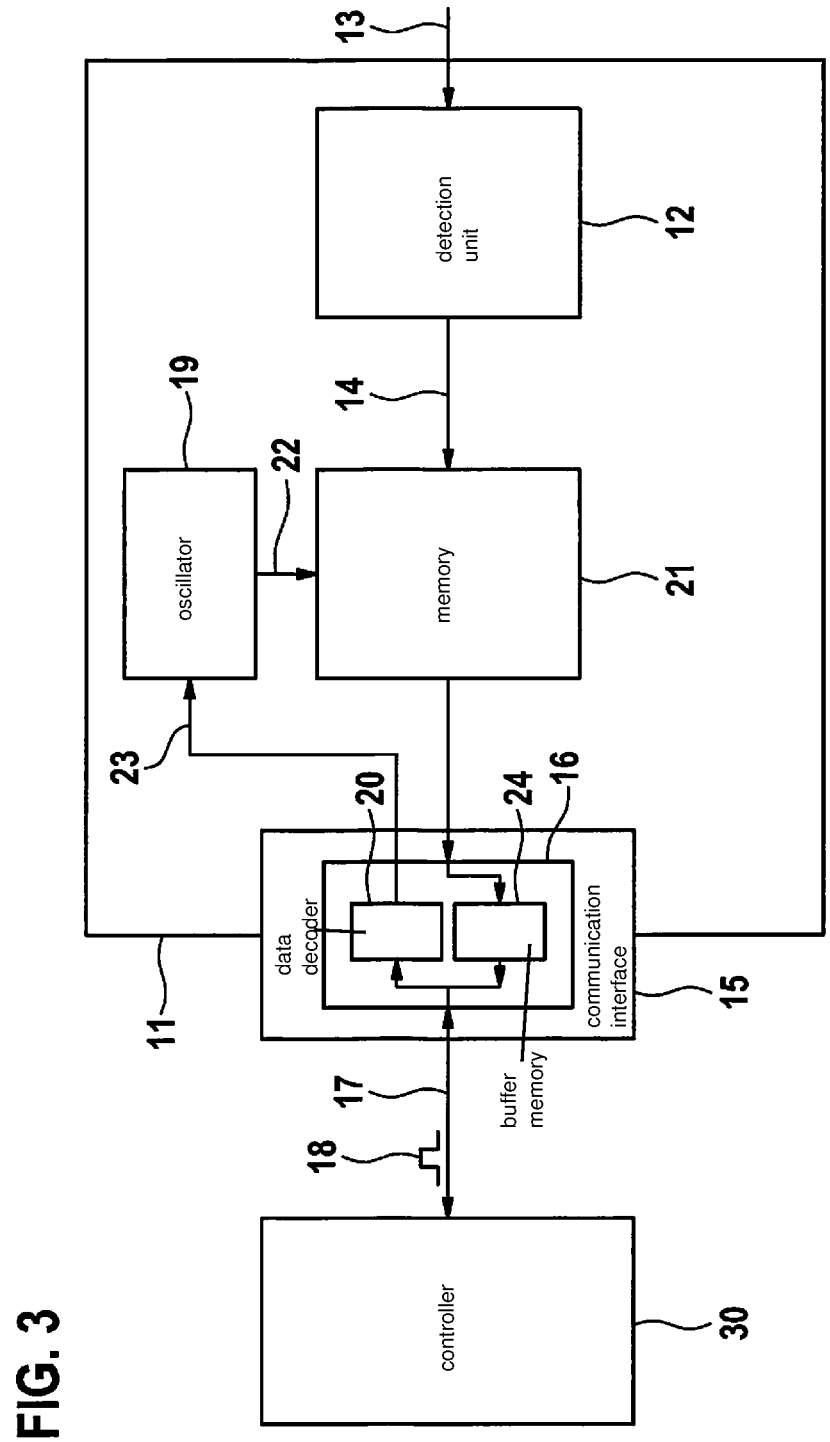
FIG. 3 shows a block diagram of one specific embodiment of a sensor system according to the present invention.

FIG. 3 shows a block diagram of one specific embodiment of a sensor system 11 according to the present invention, which is based on sensor system 1 of FIG. 1. Sensor system 11 furthermore includes a memory 21. This memory may be designed, for example, as a RAM memory 21, which requires an operating clock 22, which it receives from oscillator 19.

Memory 21 is used to store measured values 14, which detection unit 12 records during normal operation of sensor system 11. Controller 30 may now communicate via the communication interface with sensor system 11. For example, controller 30 may read measured values 14 out of memory 21 using data signal 17. In the normal operating state, oscillator 19 is switched on. Therefore, memory 21 is thus also ready for operation. It is not shown separately that other elements of sensor system 11, for example, detection unit 12, may also be supplied with an operating clock by oscillator 19.

If sensor system 11 is in an energy-saving operating mode, oscillator 19 is switched off. Oscillator 19 may then be switched on cyclically, for example, to detect measured values 14 and store them in memory 21.

Oscillator 19 may also be switched on when data signal 17 is used to retrieve measured values 14 from memory 21.

For this purpose, a data decoder 20 is provided in communication unit 16, which decodes data signal 17 and analyzes the contents of data signal 17. As already described above, oscillator 19 may be switched on under various conditions.

Oscillator 19 may only be activated, for example, if the use of memory 21 in sensor system 11 is activated at all and a data signal 17 is received. Alternatively, oscillator 19 may be switched on only if data signal 17 indicates an access to memory 21.

A buffer memory 24, which may store the, in each case, last detected measured value 14, is optionally provided in communication unit 16. This last detected measured value 14 may thus be output without activating oscillator 19 and memory 21.

Although the present invention was described above on the basis of preferred exemplary embodiments, it is not restricted thereto, but rather is modifiable in a variety of ways. In particular, the present invention may be changed or modified in manifold ways without departing from the core concept of the present invention.

LIST OF REFERENCE NUMERALS

1, 11 sensor system
2, 12 detection unit
3, 13 physical variable
4, 14 measured values
5, 15 communication interface
6, 16 communication unit
7, 17 data signal
8, 18 clock signal
9, 19 oscillator
20 data decoder
21 memory 22 operating clock
23 switching signal
24 buffer memory
30 controller

What is claimed is:

1. A sensor system, comprising:
a detection unit to detect at least one physical variable and output corresponding detected measured values;
a communication interface, including a communication unit, to output the detected measured values at least in a normal operating mode, and to receive a data signal, which includes a clock signal, the communication unit being configured to use the clock signal as the operating clock in an energy-saving operating mode; and
an oscillator to start within a predefined time and output a clock signal, wherein the communication unit is configured to start the oscillator upon receiving the data signal.

2. The sensor system as recited in claim 1, wherein the communication unit includes a data decoder to decode the data signal in the energy-saving mode and to activate the oscillator only if the data signal includes an access to the sensor system.

3. The sensor system as recited in claim 2, further comprising:
a memory, which is coupled to the oscillator and the detection unit, and which is configured to use the clock signal of the oscillator as the operating clock and to store and output measured values from the detection unit and/or configuration data for the sensor system, wherein the data decoder is configured to activate the oscillator only if use of the memory is activated in the sensor system.

4. The sensor system as recited in claim 3, wherein the memory is a RAM memory and is coupled to an energy supply in the energy-saving mode.

5. The sensor system as recited in claim 3, wherein the data decoder is configured to check whether the data signal indicates an access to the memory, and to switch on the oscillator only if the data signal indicates an access to the memory.

6. The sensor system as recited in claim 2, wherein the data decoder is configured to extract control commands from the data signal and carry the control commands out in the sensor system.

7. The sensor system as recited in claim 2, wherein the communication unit includes a buffer memory, which is configured to store, in each case, a last detected measured value.

8. A method for operating a sensor system, comprising:
detecting, via a detection unit, measured values for at least one physical variable;
outputting the detected measured values, via a communication interface including a communication unit, at least in a normal operating mode of the sensor system;
receiving a data signal, via the communication interface, which includes a clock signal;
operating the communication unit in an energy-saving operating mode using the clock signal as the operating clock; and
switching on an oscillator of the sensor system, which starts within a predefined time and outputs a corresponding clock signal, upon receiving the data signal.

9. The method as recited in claim 8, further comprising:
in the energy-saving mode, decoding the data signal in the communication unit and activating the oscillator only when the data signal includes an access to the sensor system.

10. The method as recited in claim 9, wherein the detected measured values are stored in and output from a memory, which is coupled to the oscillator and the detection unit, the memory being operated using the clock signal of the oscillator as the operating clock, and wherein the oscillator is activated only when the use of the memory in the sensor system is activated.

11. The method as recited in claim 9, wherein the oscillator is switched on only when the data signal indicates an access to the memory.

12. The method as recited in claim 9, wherein control commands are extracted from the data signal and carried out in the sensor system.

13. A method for operating a sensor system, comprising: detecting, via a detection unit, measured values for at least one physical variable; outputting the detected measured values, via a communication interface including a communication unit, at least in a normal operating mode of the sensor system; receiving a data signal, via the communication interface, which includes a clock signal; operating the communication unit in an energy-saving operating mode using the clock signal as the operating clock; and switching on an oscillator of the sensor system, which starts within a predefined time and outputs a corresponding clock signal, upon receiving the data signal; wherein, in each case, a last of the detected measured values is stored in the communication unit in a buffer memory.

* * * * *